(12) United States Patent
Zhang et al.

(10) Patent No.: US 11,025,933 B2
(45) Date of Patent: Jun. 1, 2021

(54) DYNAMIC VIDEO CONFIGURATIONS

(71) Applicant: Apple Inc., Cupertino, CA (US)

(72) Inventors: Dazhong Zhang, Milpitas, CA (US); Hang Yuan, San Jose, CA (US); Peikang Song, San Jose, CA (US); Jae Hoon Kim, San Jose, CA (US); Xing Wen, Cupertino, CA (US); Sudeng Hu, San Jose, CA (US); Xiaosong Zhou, Campbell, CA (US); Chris Y. Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 15/585,581

(22) Filed: May 3, 2017

(65) Prior Publication Data

US 2017/0359590 A1    Dec. 14, 2017

Related U.S. Application Data

(60) Provisional application No. 62/347,963, filed on Jun. 9, 2016.

(51) Int. Cl.
| | |
|---|---|
| *H04N 19/423* | (2014.01) |
| *H04N 19/463* | (2014.01) |
| *H04N 21/44* | (2011.01) |
| *H04N 21/6379* | (2011.01) |
| *H04N 21/6373* | (2011.01) |

(52) U.S. Cl.
CPC ......... *H04N 19/423* (2014.11); *H04N 19/463* (2014.11); *H04N 21/44004* (2013.01); *H04N 21/6379* (2013.01); *H04N 21/6373* (2013.01)

(58) Field of Classification Search
CPC ............................ H04N 19/00; H04N 19/423
See application file for complete search history.

(56) References Cited

U.S. PATENT DOCUMENTS

| | | | |
|---|---|---|---|
| 9,219,919 B2 | 12/2015 | Deshpande | |
| 9,510,007 B2 * | 11/2016 | Chan | ................... G06F 13/1673 |
| 2005/0152400 A1 * | 7/2005 | Suzuki | ............. H04N 21/23424 370/474 |

(Continued)

FOREIGN PATENT DOCUMENTS

WO      2015138979 A2    9/2015

*Primary Examiner* — Brian T Pendleton
*Assistant Examiner* — Kyle M Lotfi
(74) *Attorney, Agent, or Firm* — BakerHostetler

(57) ABSTRACT

Techniques are disclosed for managing memory allocations when coding video data according to multiple codec configurations. According to these techniques, devices may negotiate parameters of a coding session that include parameters of a plurality of different codec configurations that may be used during the coding session. A device may estimate sizes of decoded picture buffers for each of the negotiated codec configurations and allocate in its memory a portion of memory sized according to a largest size of the estimated decoded picture buffers. Thereafter, the devices may exchange coded video data. The exchange may involve decoding coded data of reference pictures and storing the decoded reference pictures in the allocated memory. During the coding session, the devices may toggle among the different negotiated codec configurations. As they do, reallocations of memory may be avoided.

24 Claims, 6 Drawing Sheets

(56) References Cited

U.S. PATENT DOCUMENTS

| | | | |
|---|---|---|---|
| 2013/0195183 A1* | 8/2013 | Zhai | H04N 19/172 375/240.12 |
| 2014/0016711 A1* | 1/2014 | Rodriguez | H04N 19/423 375/240.26 |
| 2014/0269899 A1* | 9/2014 | Park | H04N 19/152 375/240.02 |
| 2015/0103884 A1 | 4/2015 | Ramasubramonian et al. | |
| 2015/0358633 A1 | 12/2015 | Choi et al. | |
| 2017/0013233 A1* | 1/2017 | Kuusela | H04N 7/15 |

\* cited by examiner

100

200

400

500

600

700

800

//DYNAMIC VIDEO CONFIGURATIONS

CLAIM FOR PRIORITY

The present application benefits from priority of U.S. application Ser. No. 62/347,963, entitled "Dynamic Video Configurations" and filed Jun. 9, 2016, the disclosure of which is incorporated herein in its entirety.

BACKGROUND

The present disclosure relates to video coding techniques.

More and more real-time video applications support video configuration changes on the fly, once a video coding session has been established between coding terminals and coded video data has been exchanged between them. Video configuration changes can involve any negotiation between the terminals that redefines either the format of video exchanged between them or encoding characteristics such profile/level, resolution, color format, bit-depth, cropping parameters, and the like.

Video configuration changes can occur in many video coding use cases. For example, codec configuration changes may occur during coding sessions that carry video data for screen mirroring, screen sharing, wireless display, etc., where user can share either the entire contents of a local display (a full screen) or partial contents of the local display (an application window, a video clip of arbitrary format, a separately rendered screen) with another display, where switches switch among the contents change abruptly or even the orientation of the display change abruptly. In these cases, an encoder may redefine coding parameters to better meet changing characteristics of the video data to be coded. Ideally, revision of the coding parameters would not cause interruptions in delivery of video during the coding session.

Traditionally such changes require a reconfiguration to both encoder and decoder and a reset of the video sequence, which tend to cause long delay and degraded quality at the point of switchover from one set of coding parameters to another.

Some systems implement a better approach by creating multiple video encoder/decoder instances with each one handling a different configuration, achieving faster switch among a very limited number of configurations, at the cost of high memory consumption.

DETAILED DESCRIPTION

Embodiments of the present invention provide techniques for managing memory allocations when coding video data according to multiple codec configurations. According to these embodiments, devices may negotiate parameters of a coding session that include parameters of a plurality of different codec configurations that may be used during the coding session. A device may estimate sizes of decoded picture buffers for each of the negotiated codec configurations and allocate in its memory a portion of memory sized according to a largest size of the estimated decoded picture buffers. Thereafter, the devices may exchange coded video data. The exchange may involve decoding coded data of reference pictures and storing the decoded reference pictures in the allocated memory. During the coding session, the devices may toggle among the different negotiated codec configurations. As they do, reallocations of memory, and interruptions of video delivery that would arise therefrom, may be avoided.

Figure 1:
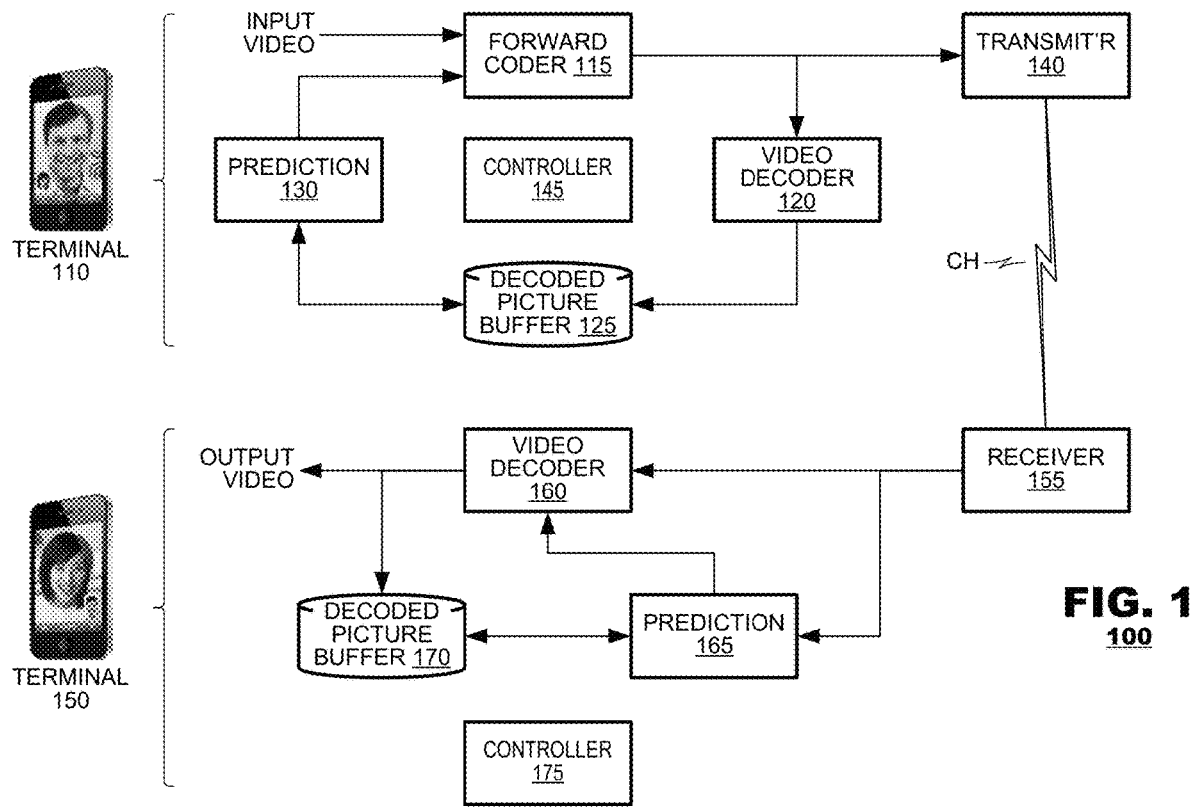
FIG. 1 illustrates a system according to an embodiment of the present disclosure.

FIG. 1 illustrates a system 100 according to an embodiment of the present disclosure. The system 100 may include a pair of terminals 110, 150 provided in mutual communication. The terminals 110, 150 may code video data for transmission to their counterparts via the network. Thus, a first terminal 110 may capture video data locally, code the video data and transmit the coded video data to the counterpart terminal 150 via a channel. The receiving terminal 150 may receive the coded video data, decode it, and render it locally, for example, on a display at the terminal 150 (not shown). If the terminals are engaged in bidirectional exchange of video data, then the terminal 150 may capture video data locally, code the video data and transmit the coded video data to the counterpart terminal 110 via another channel. The receiving terminal 110 may receive the coded video data transmitted from terminal 150, decode it, and render it locally, for example, on its own display (also not shown). The processes described herein can operate on both frame and field picture coding but, for simplicity, the present discussion will describe the techniques in the context of integral frames.

FIG. 1 illustrates a coding system of the first terminal 110, which may include a forward coder 115, a video decoder 120, a decoded picture buffer 125, a prediction unit 130, a transmitter 140, and a controller 145. The forward coder 115 may code input video by data compression techniques, typically, motion compensated prediction. The video decoder 120 may decode select frames of coded video (called "reference frames," herein) for use as prediction references when the terminal 110 codes later-received input frames. The decoded picture buffer 125 may store the decoded reference frames at the first terminal. The prediction unit 130 may predict content of input data from reference frames stored in the decoded picture buffer 125. The transmitter 140 may transmit coded video data output from the forward coder to the second terminal 150. The controller 145 may govern operation of the terminal 110.

The forward coder 115 may perform coding operations on the video to reduce its bandwidth. Typically, the coder 115 exploits temporal and/or spatial redundancies within the source video. For example, the coding system 140 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and bi-predictive inter-coding, in which an input pixel block is coded differentially with respect to data of a pair of previously coded/decoded frames.

combined inter-intra coding in which an input pixel block is coded differentially with respect to data from both a previously coded/decoded frame and data from the current/common frame.

multi-hypothesis inter-intra coding, in which an input pixel block is coded differentially with respect to data from several previously coded/decoded frames, as well as potentially data from the current/common frame.

Pixel blocks also may be coded according to other coding modes such as the Transform Skip and reduced resolution update ("RRU") coding modes.

Coding operations of the system 100 may be governed by a coding protocol such as one of the protocols defined in the ITU H.263, H.264 and/or H.265 specifications. The forward coder 115 may code input frames according to techniques defined by the coding protocol and the video decoder 120 may decode the coded frames according to the same techniques.

FIG. 1 also illustrates a decoding system of the second terminal 150, which may include a receiver 155, a video decoder 160, a prediction unit 165, a decoded picture buffer 170, and a controller 175. The receiver 155 may receive coded video data from the channel CH. The video decoder 160 may decode coded video with reference to prediction data. The prediction unit 165 may retrieve predicted content from the decoded picture buffer 170 as determined by prediction indicators (typically, coding mode and motion vectors) provided in coded video data. The decoded picture buffer 170 may store decoded reference frames output by the video decoder 160. The controller 175 may govern operation of the terminal 150.

The receiver 155 may receive a data from the network and may route components of the data stream to appropriate units within the terminal 150. Although FIG. 1 illustrates functional units for video coding and decoding, the terminals 110, 150 typically will include coding/decoding systems for audio data associated with the video and perhaps other processing units (not shown). Thus, the receiver 155 may parse the coded video data from other elements of the data stream and route it to the video decoder 160.

The video decoder 160 may perform decoding operations that invert coding operations performed by the forward coder 115. The decoded picture buffer 170 may store reconstructed reference frames for use in prediction operations. The prediction unit 165 may predict data for input pixel blocks from within the reference frames stored by the picture buffer according to prediction reference data provided in the coded video data. Thus, the coded video data may identify a prediction mode that was applied by the forward coder 115, such as intra-coding, single prediction inter-coding, bi-predictive inter-coding or another prediction mode described above, and may retrieve image data from the decoded picture buffer 170 according to the identified mode. The prediction unit 165 may forward the retrieved image data to the video decoder 160 where it inverts the differential coding processes applied by the forward coder 115.

The coding and decoding systems that are shown in FIG. 1 for the terminals 110 and 150, respectively, support unidirectional exchange of coded video data from the first terminal 110 to the second terminal 150. Many coding applications requires bidirectional exchange of coded video, in which case the second terminal 150 may have a coding system formed of units 115-140 (not shown) and the first terminal 110 may have a decoding system formed of units 155-170 (also not shown).

A video coding system 100 may be used in a variety of applications. In a first application, the terminals 110, 150 may support real-time bidirectional exchange of coded video to establish a video conferencing session between them. In another application, a terminal 110 may code pre-produced video (for example, television or movie programming) and store the coded video for delivery to one or, often, many downloading clients (e.g., terminal 150). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 150 are illustrated as smart phones but the principles of the present disclosure are not so limited. Embodiments of the present disclosure also find application with computers (both desktop and laptop computers), tablet computers, computer servers, media players, dedicated video conferencing equipment and/or dedicated video encoding equipment.

The network represents any number of networks that convey coded video data between the terminals 110, 150, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 2:
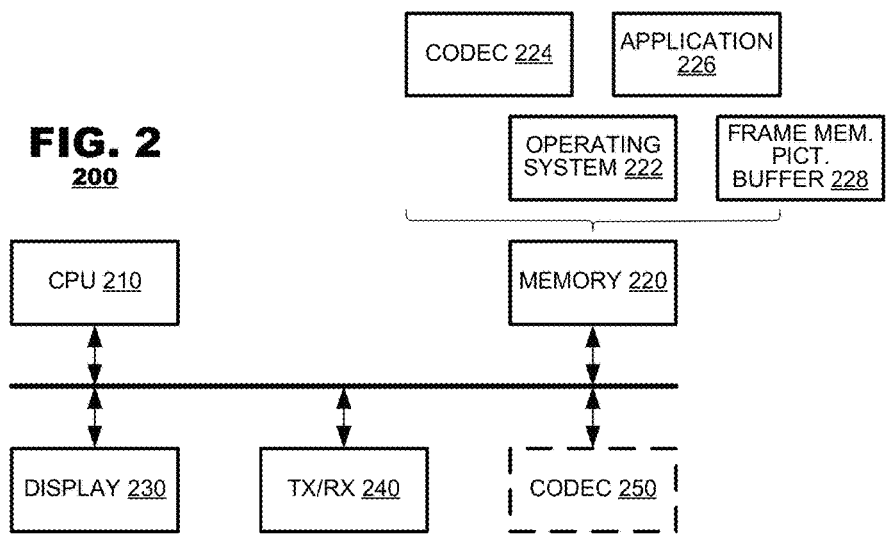
FIG. 2 is a simplified block diagram schematic view of a terminal according to an embodiment of the present disclosure.

FIG. 2 is a simplified block diagram schematic view of a terminal 200 according to an embodiment of the present disclosure. The terminal 200 may include a central processing unit ("CPU") 210, a memory system 220, a display 230, a transceiver 240 and a codec 224/250 provided in communication with each other.

The CPU 210 may control the operation of components within client terminal 200. The CPU 210 may execute program instructions stored by the memory system 220, which may define an operating system 222 of the terminal and various tools and program applications, such as a codec 224 and/or an application program 226. In some applications, the codec 224 may be provided as a software-based codec but, in other applications, the codec may as a hardware device 250 (shown in phantom in FIG. 2). The memory 220 also may have a memory space 228 allocated for use as a decoded picture buffer. The space 228 may be allocated for storage of reference pictures regardless of whether the codec 224/250 operates as a video coder 115 (FIG. 1), video decoder 160 (FIG. 1) or both.

In the various implementations, the memory system 220 may include one or more storage media, including, for example, electric-, magnetic- and/or optic-based storage media. The memory system 220 may include a hard drive, flash memory, permanent memory such as read-only memory ("ROM"), semi-permanent memory such as random access memory ("RAM"), any other suitable type of storage component, or any combination thereof. The memory system 220 may include cache memory, which may be one or more different types of memory used for temporarily storing data for electronic device applications.

The transceiver 240 may enable the client terminal 200 to communicate with other electronic devices (such as the distribution server 110) using a communications protocol. For example, transceiver 240 may support Wi-Fi (e.g., an 802.11 protocol), Ethernet, Bluetooth, high frequency systems (e.g., 700 MHz, 3.4 GHz, and 2.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

The terminal 200 may also include one or more output components including display(s) 230. Output components may render information (e.g., audio and video) to a user of terminal 200. An output component of client terminal 200 may take various forms, including, but not limited, to audio speakers, headphones, visual displays, head mounted displays, etc. For example, display 230 may include any suitable type of display or interface for presenting visible information to a user of client terminal 200. In some embodiments, display 230 may include an embedded or coupled display. Display 230 may include, for example, a touch screen, a liquid crystal display ("LCD"), a light emitting diode ("LED") display, an organic light-emitting diode ("OLED") display, or any other suitable type of display.

During operation, the terminals 110, 150 (FIG. 1) may negotiate various parameters of a coding session. For example, the terminals 110, 150 may exchange data defining the format of video or encoding characteristics such as profile/level, frame sizes, frame resolution, color formats, bit-depth of color information, cropping parameters and the like. The terminals 110, 150 may reserve memory spaces 228 in system memory (FIG. 2) for use as decoded picture buffers 125, 170. The sizes of the reserved memory spaces may fluctuate based on the negotiated coding parameters, which may vary over the course of a video coding session.

Buffers for pre-processing before the encoding and post-processing after decoding can also potentially benefit from this approach.

For example, if the highest possible video resolution, color format, and bit-depth are 4 k, 4:4:4, and 12-bit, the universal buffer format can be defined to support 4 k, 4:4:4, 12-bit video. During switchover events from on configuration set to another, encoding terminals 110 and decoding terminals 150 may modify some buffer parameters like width/height/stride, and use only part of the memory to support a lower configuration. These operations may be performed faster than releasing and re-allocating different sets of internal buffers within terminal devices 110, 150, which can reduces delays in rendered output. The required amount of memory is constant and does not increase with the number of configuration sets.

Figure 3:
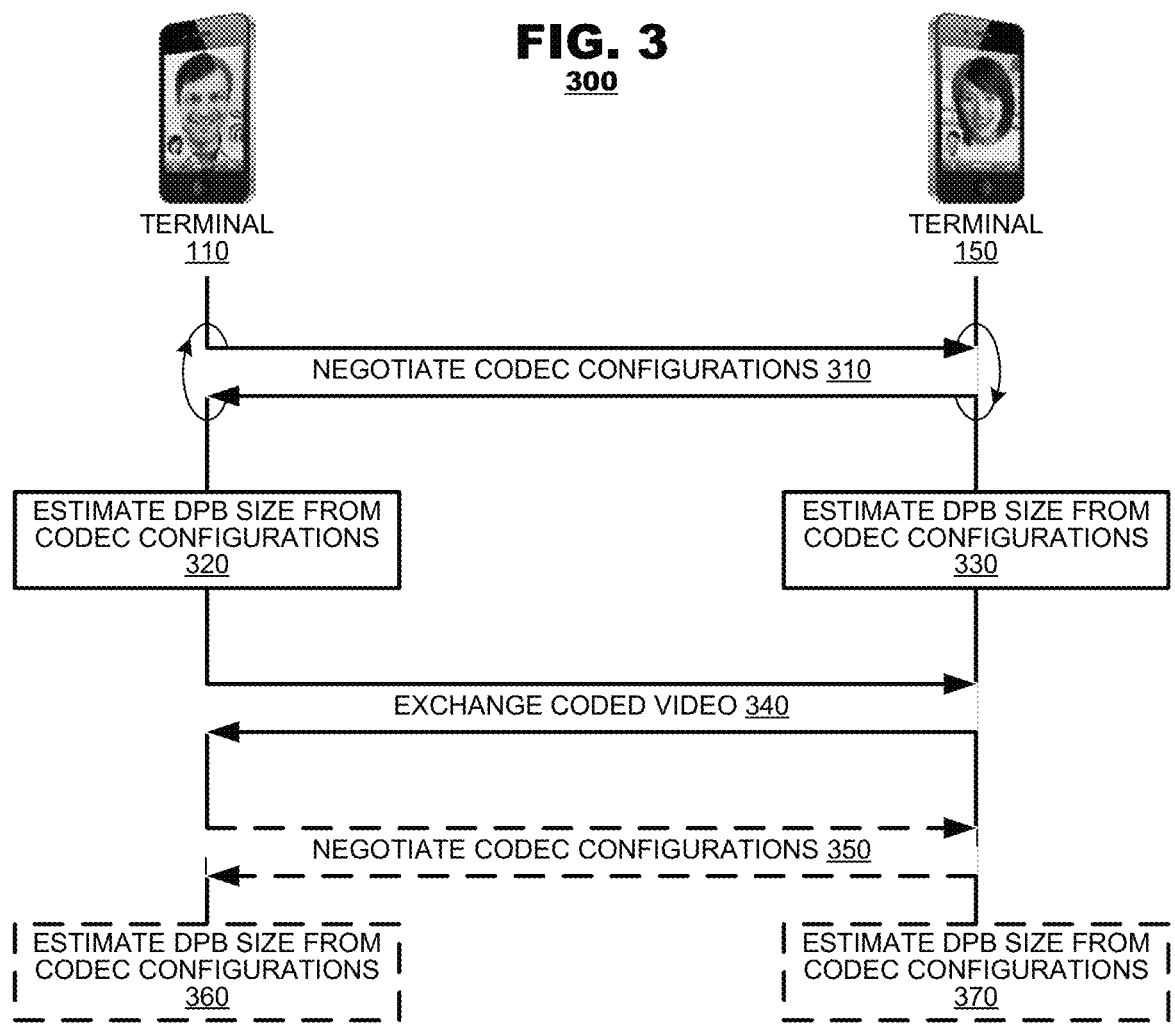
FIG. 3 illustrates a method according to an embodiment of the present disclosure.

FIG. 3 illustrates a method 300 according to an embodiment of the present disclosure. According to the method, two terminals to a video coding session may negotiate parameters of multiple codec configurations (msg. 310). In so doing, the terminals may define multiple sets of configuration data that define how coding systems and decoding systems will operate. These sets of configuration data may include, for example, selections among the profile/level, frame size, frame resolution, color formats, bit-depth of color information, cropping parameter characteristics described above.

Once the different codec configurations have been defined, the terminals may estimate sizes of their respective decoded picture buffers as well as other internal buffers for pre-processing and post-processing from the defined codec configurations (boxes 320, 330). The sizes may be selected to be sufficient to accommodate as many decoded pictures as are supported by the coding protocols using the codec configuration that yield the largest frame sizes. For example, given two frames of common size and resolution, a frame having 12-bit color information will occupy a larger memory space than another frame having 8-bit color information. Similarly, a high resolution version of a frame will occupy a larger memory space than a low resolution version of the same frame. The terminals may estimate the largest decoded picture buffer size that will be required under all the codec configurations negotiated in messaging flow 310 and reserve those memory spaces in steps 320 and 330, respectively.

Once the sizes of the decoded picture buffers are estimated and reserved, the terminals may exchange coded video (msg. 340).

Some coding protocols permit terminals to define new codec configurations after exchange of coded video has begun (msg. 350). In such embodiments, the terminals may repeat their estimates of the decoded picture buffer sizes based on the codec configurations that remain active at the terminals (boxes 360, 370). When the new codec configuration does not require an increase in the size of memory reserved for the decoded picture buffer, the memory reservations need not change. But, if the new codec configuration does require an increase in the size of memory reserved for the decoded picture buffer, the memory reservations may be increase accordingly.

Figure 4:
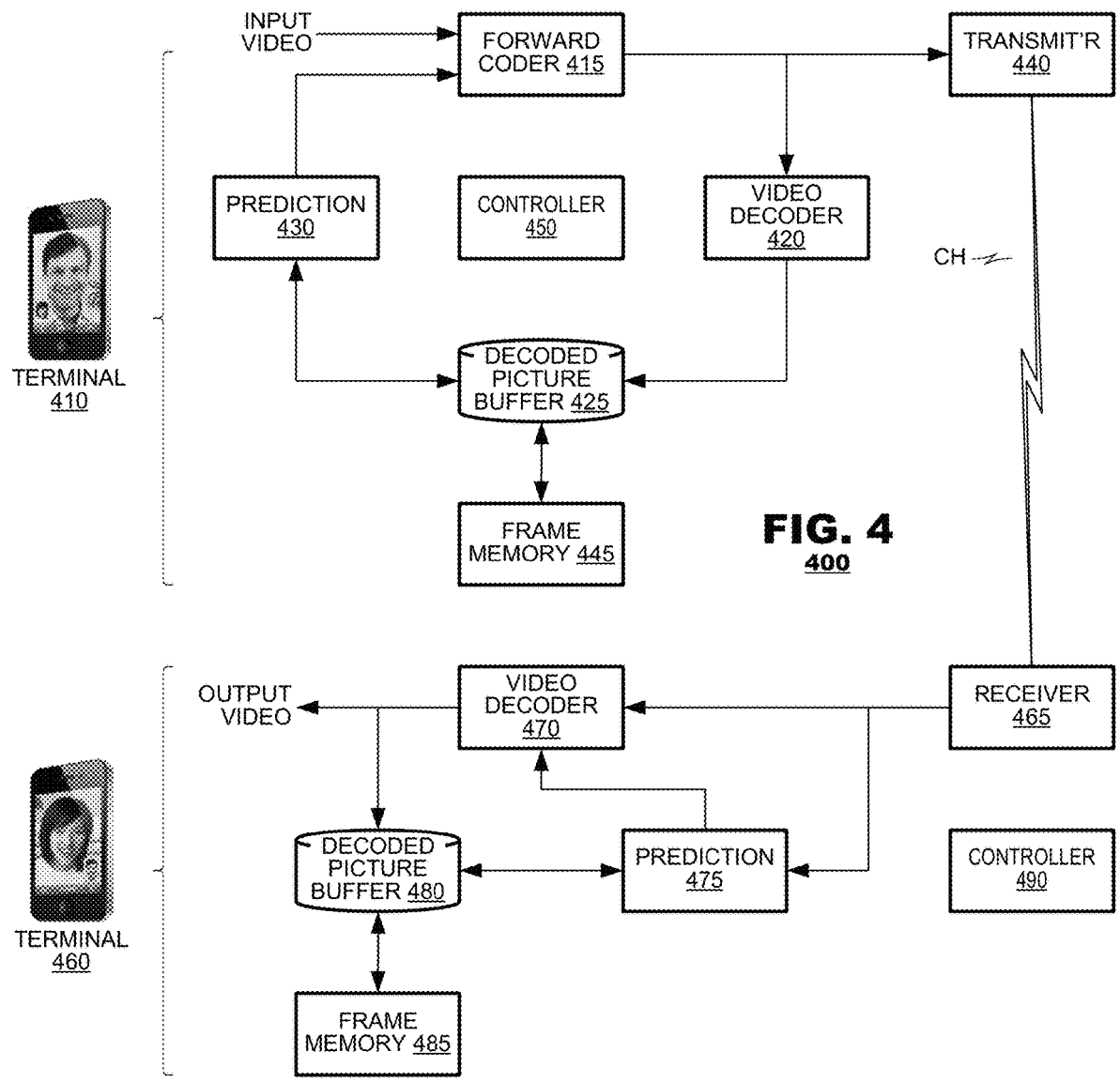
FIG. 4 illustrates a system according to another embodiment of the present disclosure.

FIG. 4 illustrates a system 400 according to another embodiment of the present disclosure. The system 400 may include a pair of terminals 410, 460 provided in mutual communication. The first terminal 410 may code video for transmission to the second terminal 460 via a channel CH. The second terminal 460 may decode the coded video for local consumption.

The first terminal 410 may capture video data locally, code the video data and transmit the coded video data to the counterpart terminal 460 via a channel CH. The receiving terminal 460 may receive the coded video data, decode it, and render it locally, for example, on a display at the terminal 460 (not shown). If the terminals are engaged in bidirectional exchange of video data, then the terminal 460 may capture video data locally, code the video data and transmit the coded video data to the counterpart terminal 410 via another channel. The receiving terminal 410 may receive the coded video data transmitted from terminal 460, decode it, and render it locally, for example, on its own display (also not shown). Again, the processes described can operate on both frame and field picture coding but, for simplicity, the present discussion will describe the techniques in the context of integral frames.

FIG. 4 illustrates a coding system of the first terminal 410, which may include a forward coder 415, a video decoder 420, a decoded picture buffer 425, a prediction unit 430, a transmitter 440, a frame memory 445 and a controller 450. The forward coder 415 may code input video by data compression techniques, typically, motion compensated prediction. The video decoder 420 may decode frames designated as reference frames for use as prediction references the terminal 410 codes later-received input frames. The decoded picture buffer 425 may store the decoded reference frames at the first terminal. The prediction unit 430 may predict content of input data from reference frames stored in the decoded picture buffer 425. The frame memory 445 may store contents of the decoded picture buffer 425 when codec configuration changes occur. The transmitter 440 may transmit coded video data output from the forward coder to the second terminal 460. The controller 450 may govern operation of the terminal 410.

The forward coder 415 may perform coding operations on the video to reduce its bandwidth. Typically, the coder 415 exploits temporal and/or spatial redundancies within the source video. For example, the coding system 440 may perform motion compensated predictive coding in which video frame or field pictures are parsed into pixel blocks and individual pixel blocks are coded differentially with respect to predicted pixel blocks, which are derived from previously-coded video data. A given pixel block may be coded according to any one of a variety of predictive coding modes, such as:

- intra-coding, in which an input pixel block is coded differentially with respect to previously coded/decoded data of a common frame;
- single prediction inter-coding, in which an input pixel block is coded differentially with respect to data of a previously coded/decoded frame; and
- bi-predictive inter-coding, in which an input pixel block is coded differentially with respect to data of a pair of previously coded/decoded frames.
- combined inter-intra coding in which an input pixel block is coded differentially with respect to data from both a previously coded/decoded frame and data from the current/common frame.
- multi-hypothesis inter-intra coding, in which an input pixel block is coded differentially with respect to data from several previously coded/decoded frames, as well as potentially data from the current/common frame.

Pixel blocks also may be coded according to other coding modes such as the Transform Skip and RRU coding modes.

Coding operations of the system 400 may be governed by a coding protocol such as one of the protocols defined in the ITU H.263, H.264 and/or H.265 specifications. The forward coder 415 may code input frames according to techniques defined by the coding protocol and the video decoder 420 may decode the coded frames according to the same techniques.

FIG. 4 also illustrates a decoding system of the second terminal 460, which may include a receiver 465, a video decoder 470, a prediction unit 475, a decoded picture buffer 480, a frame memory 485, and a controller 490. The receiver 465 may receive coded video data from the channel CH. The video decoder 470 may decode coded video with reference to prediction data. The prediction unit 475 may retrieve predicted content from the decoded picture buffer 480 as determined by prediction indicators (typically, mode and motion vectors) provided in coded video data. The decoded picture buffer 480 may store decoded reference frames output by the video decoder 470. The frame memory 485 may store contents of the decoded picture buffer 480 when codec configuration changes occur. The controller 490 may govern operation of the terminal 460.

The receiver 465 may receive a data from the network and may route components of the data stream to appropriate units within the terminal 460. Although FIG. 4 illustrates functional units for video coding and decoding, the terminals 410, 460 typically will include coding/decoding systems for audio data associated with the video and perhaps other processing units (not shown). Thus, the receiver 465 may parse the coded video data from other elements of the data stream and route it to the video decoder 470.

The video decoder 470 may perform decoding operations that invert coding operations performed by the forward coder 415. The decoded picture buffer 480 may store reconstructed reference frames for use in prediction operations. The prediction unit 475 may predict data for input pixel blocks from within the reference frames stored by the picture buffer according to prediction reference data provided in the coded video data. Thus, the coded video data may identify a prediction mode that was applied by the forward coder 415, such as intra-coding, single prediction inter-coding, bi-predictive inter-coding or another prediction mode described above, and may retrieve image data from the decoded picture buffer 480 according to the identified mode. The prediction unit 475 may forward the retrieved image data to the video decoder 470 where it inverts the differential coding processes applied by the forward coder 415.

The coding and decoding systems that are shown in FIG. 4 for the terminals 410 and 460, respectively, support unidirectional exchange of coded video data from the first terminal 410 to the second terminal 460. Many coding applications requires bidirectional exchange of coded video, in which case the second terminal 460 may have a coding system formed of units 415-140 (not shown) and the first terminal 410 may have a decoding system formed of units 465-170 (also not shown).

A video coding system 400 may be used in a variety of applications. For example, the terminals 410, 460 may support videoconferencing or video streaming applications where video content generated by the terminal 410, for example, video captured by a camera (not shown) or generated by an application (also not shown) executing locally at the terminal 410 is to be delivered to the second terminal 460 for local display or storage. In a first application, the terminals 410, 460 may support real time bidirectional exchange of coded video to establish a video conferencing session between them. In another application, a terminal 410 may code pre-produced video (for example, television or movie programming) and store the coded video for delivery to one or, often, many downloading clients (e.g., terminal 460). Thus, the video being coded may be live or pre-produced, and the terminal 410 may act as a media server, delivering the coded video according to a one-to-one or a one-to-many distribution model. For the purposes of the present discussion, the type of video and the video distribution schemes are immaterial unless otherwise noted.

In FIG. 4, the terminals 410, 460 are illustrated as smart phones but the principles of the present disclosure are not so limited. Embodiments of the present disclosure also find application with computers (both desktop and laptop computers), tablet computers, computer servers, media players, dedicated video conferencing equipment and/or dedicated video encoding equipment.

The network represents any number of networks that convey coded video data between the terminals 410, 460, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

During operation, the terminals 410, 460 may negotiate various parameters of a coding session. For example, the terminals 410, 460 may exchange data defining the format of video or encoding characteristics such as profile/level, frame sizes, frame resolution, color formats, bit-depth of color information, cropping parameters and the like. For convenience, each set of coding parameters is called a "configuration set" herein.

During coding, an encoding terminal 410 may switch among a variety of different configuration sets to code input frames. Ordinarily, when an encoder switches from one configuration set to another, the encoder must disqualify all previously-stored frames in a decoded picture buffer from being used for prediction of new frames under the new configuration set. As a consequence, a first frame coded under the new set of parameters is coded as an intra-coded frame (typically, an instantaneous decoder refresh ("IDR") frame). An IDR is generally much more expensive than inter-coded frames such as unidirectionally-predicted or bidirectionally predicted frames ("P" and "B" frames, respectively), which may add to delay and/or suffer from bad quality due to their higher bit rate.

In an embodiment, when an encoding terminal 410 determines to switch from one configuration set to another, the encoder may transfer a select frame from the decoded picture buffer 425 to the frame memory 445. The transferred frame may be preserved for use by the encoder if the encoder elects to re-use a prior configuration set later during coding. In this case, the frame that was transferred to the frame memory 445 when use of a configuration set was discontinued may be transferred back to the decoded picture buffer 425 when use of that configuration set is resumed.

Similarly, when a decoding terminal 460 receives coded video data that discontinues use of a first configuration set and begins use of a second configuration set, the decoding terminal 460 may transfer a select frame from the decoded picture buffer 480 to a frame memory 485. The transferred frame may be preserved for use by the decoding terminal 460 if the decoding terminal 460 receives coded video data that indicates that use of the first configuration set resumed. In this case, the frame that was transferred to the frame memory 485 when use of a configuration set was discontinued may be transferred back to the decoded picture buffer 480 when use of that configuration set is resumed.

Frame memory 445 and 485 may either be a set of separately allocated buffers or may share with the decoded picture buffer. For the former case, there is virtually no limit of the number of frames that can be stored as long as the system memory allows. For the latter case, the number of frames is limited since the decoded picture buffer size is usually limited according to the specific video coding standard being used.

When the frame memory share buffers with the decoded picture buffer, syntax elements may be provided in a coding protocol to signal which buffers are retained from earlier configuration and which ones are used for the current. For example, a long term reference ("LTR") syntax element may be defined to retain decoded pictures from earlier configuration sequences. These LTR frames may not be discarded upon a video format re-configuration or when a traditional IDR is coded. Of course additional syntax elements may be provided to describe how these new types of LTR frames are retained, replaced and/or removed. This is especially convenient to implement if a universal buffer format is used for the decoded picture buffer as described in the first part of this disclosure. In this case the decoded picture buffer may contain mixed format of decoded pictures in both encoder and decoder.

The preservation of content from a decoded picture buffer permits an encoding terminal 410 to avoid use of an IDR frame when resuming use of previously used configuration sets. The encoding terminal 410 may apply inter-coding techniques to new frames being coded according to the previously-used configuration set, using the transferred frame in the frame memory 445 as a reference frame. The same reference frame should be available to the decoding terminal 460 in its frame memory 485.

In an embodiment, the encoding terminal 410 and decoding terminal 460 may use a common protocol to select frames to be transferred from the decoded picture buffers 425, 480 to their respective frame memories 445, 485. In many cases, it will be sufficient to select a most recently decoded reference frame for transfer.

Modern coding standards do not support preservation of frames from a decoded picture buffer when switching configuration sets. In an embodiment, a syntax element will be added to a protocol to permit retention of frames upon switching among configuration sets. The retention may be performed through use of implied signaling, for example, transfer of the select reference frame may occur automatically in response to a switch in configuration settings. Alternatively, express signaling may be used, either by expanding signaling used by the coding protocols or employing alternative signaling (for example, by use of a supplemental enhancement information ("SEI") message).

Figure 5:
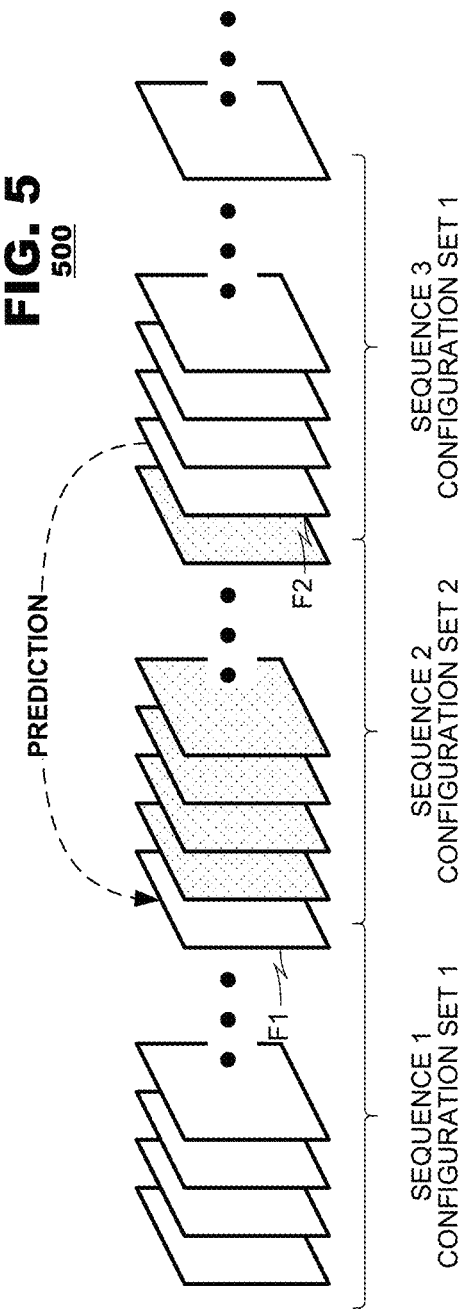
FIG. 5 illustrates prediction chains among an exemplary sequence of frames.

FIG. 5 illustrates prediction chains among an exemplary sequence of frames. In FIG. 5, a first sequence of frames (Sequence 1) is shown using a configuration set 1, a second sequence of frames (Sequence 2) is shown using a configuration set 2, and a third sequence of frames (Sequence 3) is shown using the configuration set 1.

Figure 6:
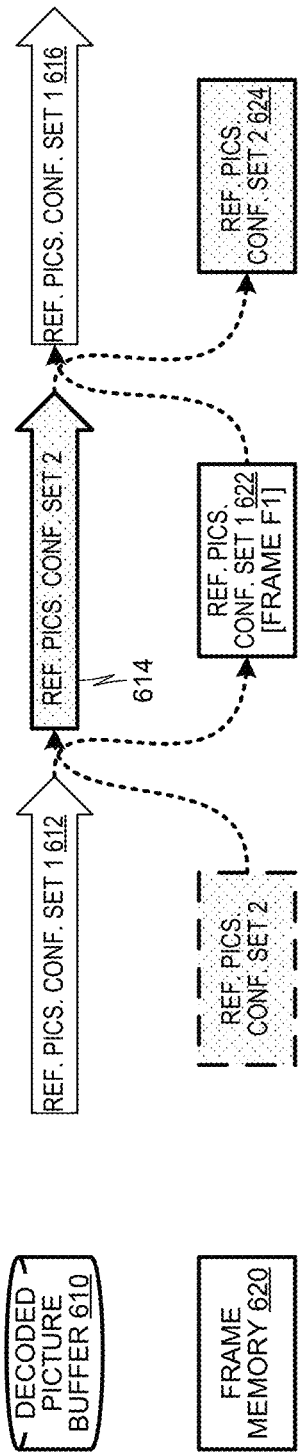
FIG. 6 illustrates state of a decoded picture buffer and frame memory when operating on the exemplary prediction chain of FIG. 5 according to an embodiment of the present disclosure.

FIG. 6 illustrates state of a decoded picture buffer 610 and frame memory 620 when operating on the exemplary prediction chain of FIG. 5 according to an embodiment of the present disclosure. When an encoding process or decoding process switches from configuration set 1 to configuration set 2, a reference pictures 612 from Sequence 1 (such as frame F1) may be transferred from a decoded picture buffer 610 to a frame memory 620, or marked for retention in a decoded picture buffer 610 in both the encoding terminal and the decoding terminal. Later, when the process switches from configuration set 2 back to configuration set 1, a frame F2 in Sequence 3 may be predicted using frame F1 as a prediction reference. In an embodiment, the reference pictures 622 for configuration set 1 may be transferred from the frame memory 620 to the decoded picture buffer 610. Use of frame F1 as a prediction reference may avoid the coding expense of coding IDR frames at the onset of sequence 3.

Similarly, when the process switches from configuration set 2 back to configuration set 1, reference frame(s) developed during processing of sequence 2 may be pushed from the decoded picture buffer 610 to the frame memory 620 (operation 624). Thus, if use of configuration set 2 resumes at a later point during coding, the reference pictures 624 of configuration set 2 may be retrieved and coding may begin using inter-coding techniques.

Figure 7:
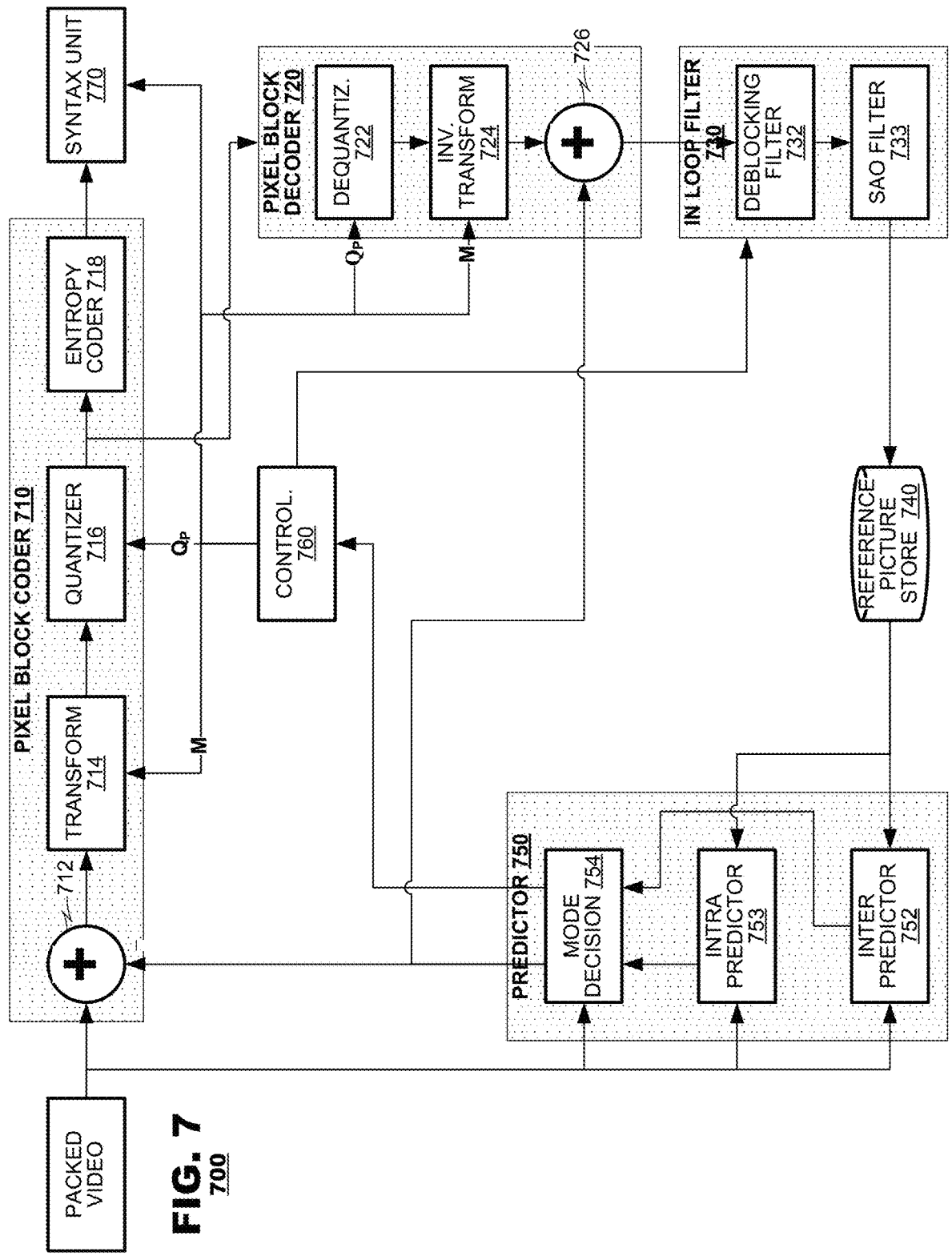
FIG. 7 is a functional block diagram of a coding system according to an embodiment of the present disclosure.

FIG. 7 is a functional block diagram of a coding system 700 according to an embodiment of the present disclosure. The system 700 may include a pixel block coder 710, a pixel block decoder 720, an in-loop filter system 730, a reference picture store 740, a predictor 750, a controller 760, and a syntax unit 770. The pixel block coder 710 may code the new pixel block by predictive coding techniques and present coded pixel block data to the syntax unit 770. The pixel block decoder 720 may decode the coded pixel block data, generating decoded pixel block data therefrom. The in-loop filter 730 may perform various filtering operations on a decoded picture that is assembled from the decoded pixel blocks obtained by the pixel block decoder 720. The filtered picture may be stored in the reference picture store 740 where it may be used as a source of prediction of a later-received pixel block. The predictor 750 may predict data for use during coding of a newly-presented input pixel block. The syntax unit 770 may assemble a data stream from the coded pixel block data which conforms to a governing coding protocol.

The pixel block coder 710 may include a subtractor 712, a transform unit 714, a quantizer 716, and an entropy coder 718. The pixel block coder 710 may accept pixel blocks of input data at the subtractor 712. The subtractor 712 may receive predicted pixel blocks from the predictor 750 and generate an array of pixel residuals therefrom representing a difference between the input pixel block and the predicted pixel block. The transform unit 714 may apply a transform to the sample data output from the subtractor 712, to convert data from the pixel domain to a domain of transform coefficients. The quantizer 716 may perform quantization of transform coefficients output by the transform unit 714. The quantizer 716 may be a uniform or a non-uniform quantizer. The entropy coder 718 may reduce bandwidth of the output of the coefficient quantizer by coding the output, for example, by variable length code words.

The transform unit 714 may operate in a variety of transform modes as determined by the controller 760. For example, the transform unit 714 may apply a discrete cosine transform (DCT), a discrete sine transform (DST), a Walsh-Hadamard transform, a Haar transform, a Daubechies wavelet transform, or the like. In an embodiment, the controller 760 may select a coding mode M to be applied by the transform unit 715, may configure the transform unit 715 accordingly and may signal the coding mode M in the coded video data, either expressly or impliedly.

The quantizer 716 may operate according to a quantization parameter $Q_P$ that is supplied by the controller 760. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameter array.

The entropy coder 718, as its name implies, may perform entropy coding of data output from the quantizer 716. For example, the entropy coder 718 may perform run length coding, Huffman coding, Golomb coding and the like.

The pixel block decoder 720 may invert coding operations of the pixel block coder 710. For example, the pixel block decoder 720 may include a dequantizer 722, an inverse transform unit 724, and an adder 726. The pixel block decoder 720 may take its input data from an output of the quantizer 716. Although permissible, the pixel block decoder 720 need not perform entropy decoding of entropy-coded data since entropy coding is a lossless event. The dequantizer 722 may invert operations of the quantizer 716 of the pixel block coder 710. The dequantizer 722 may perform uniform or non-uniform de-quantization as specified by the decoded signal $Q_P$. Similarly, the inverse transform unit 724 may invert operations of the transform unit 714. The dequantizer 722 and the inverse transform unit 724 may use the same quantization parameters $Q_P$ and transform mode M as their counterparts in the pixel block coder 710. Quantization operations likely will truncate data in various respects and, therefore, data recovered by the dequantizer 722 likely will possess coding errors when compared to the data presented to the quantizer 716 in the pixel block coder 710.

The adder 726 may invert operations performed by the subtractor 712. It may receive the same prediction pixel block from the predictor 750 that the subtractor 712 used in generating residual signals. The adder 726 may add the prediction pixel block to reconstructed residual values output by the inverse transform unit 724 and may output reconstructed pixel block data.

The in-loop filter 730 may perform various filtering operations on recovered pixel block data. For example, the in-loop filter 730 may include a deblocking filter 732 and a sample adaptive offset ("SAO") filter 733. The deblocking filter 732 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 730 may operate according to parameters that are selected by the controller 760.

The reference picture store 740 may store filtered image data for use in later prediction of other pixel blocks. Different types of prediction data are made available to the predictor 750 for different prediction modes. For example, for an input pixel block, intra prediction takes a prediction reference from decoded data of the same picture in which the input pixel block is located. Thus, the reference picture store 740 may store decoded pixel block data of each picture as it is coded. For the same input pixel block, inter prediction may take a prediction reference from previously coded and decoded picture(s) that are designated as reference pictures. Thus, the reference picture store 740 may store these decoded reference pictures.

As discussed, the predictor 750 may supply prediction data to the pixel block coder 710 for use in generating residuals. The predictor 750 may include an inter predictor 752, an intra predictor 753 and a mode decision unit 752. The inter predictor 752 may receive pixel block data representing a new pixel block to be coded and may search reference picture data from store 740 for pixel block data from reference picture(s) for use in coding the input pixel block. The inter predictor 752 may support a plurality of inter prediction modes, such as P mode coding and B mode coding. The inter predictor 752 may select an inter prediction mode and an identification of candidate prediction reference data that provides a closest match to the input pixel block being coded. The inter predictor 752 may generate prediction reference metadata, such as motion vectors, to identify which portion(s) of which reference pictures were selected as source(s) of prediction for the input pixel block.

The intra predictor 753 may support Intra (I) mode coding. The intra predictor 753 may search from among pixel block data from the same picture as the pixel block being coded that provides a closest match to the input pixel block. The intra predictor 753 also may generate prediction reference indicators to identify which portion of the picture was selected as a source of prediction for the input pixel block.

The mode decision unit 752 may select a final coding mode to be applied to the input pixel block. Typically, as described above, the mode decision unit 752 selects the prediction mode that will achieve the lowest distortion when video is decoded given a target bitrate. Exceptions may arise when coding modes are selected to satisfy other policies to which the coding system 700 adheres, such as satisfying a particular channel behavior, or supporting random access or data refresh policies. When the mode decision selects the final coding mode, the mode decision unit 752 may output a selected reference block from the store 740 to the pixel block coder and decoder 710, 720 and may supply to the controller 760 an identification of the selected prediction mode along with the prediction reference indicators corresponding to the selected mode.

The controller 760 may control overall operation of the coding system 700. The controller 760 may select operational parameters for the pixel block coder 710 and the predictor 750 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 770, which may include data representing those parameters in the data stream of coded video data output by the system 700. The controller 760 also may select between different modes of operation by which the system may generate reference images and may include metadata identifying the modes selected for each portion of coded data.

During operation, the controller 760 may revise operational parameters of the quantizer 716 and the transform unit 715 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 760 may control operation of the in-loop filter 730 and the prediction unit 750. Such control may include, for the prediction unit 750, mode selection (lambda, modes to be tested, search windows, distortion strategies, etc.), and, for the in-loop filter 730, selection of filter parameters, reordering parameters, weighted prediction, etc.

Figure 8:
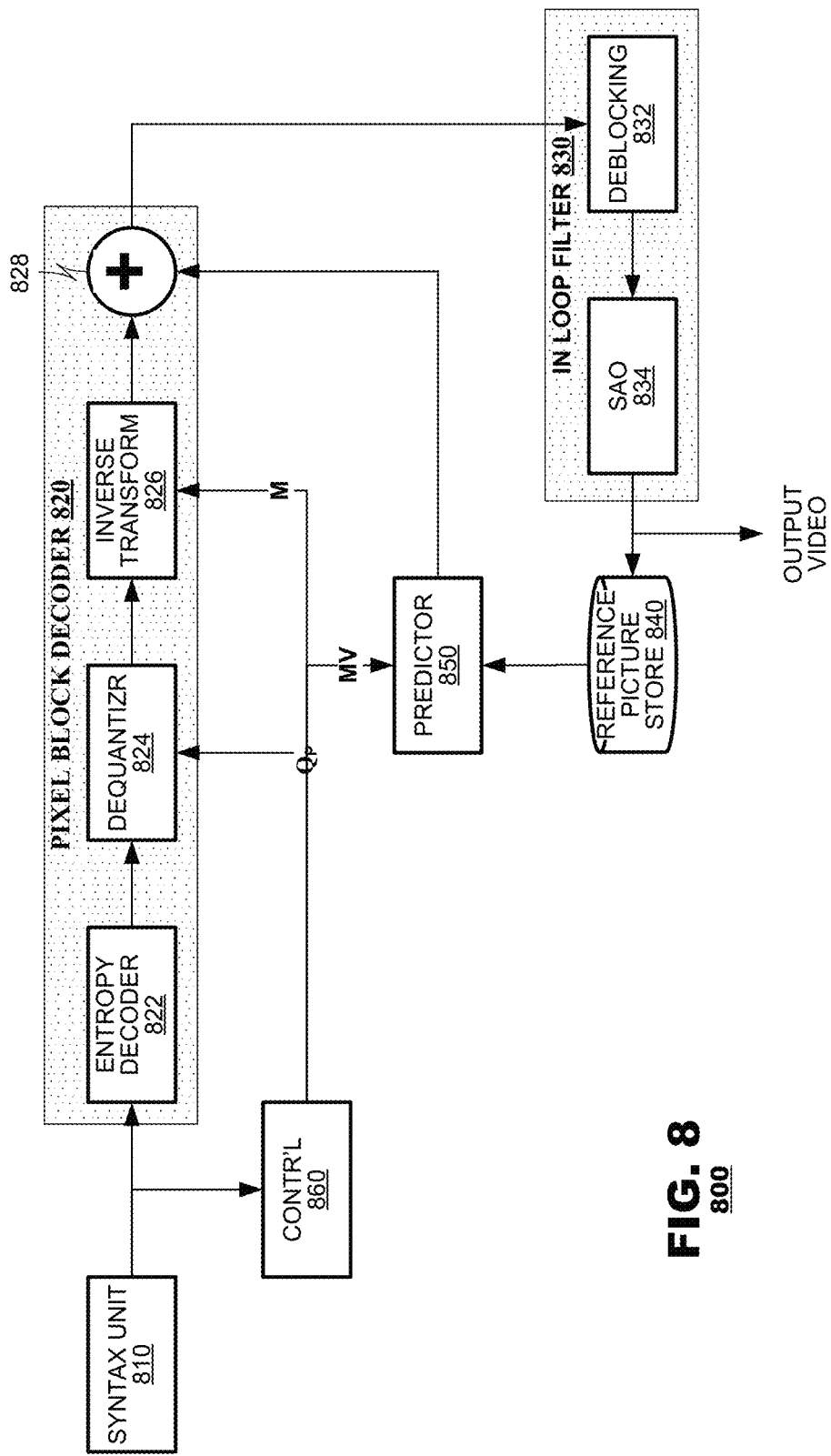
FIG. 8 is a functional block diagram of a decoding system according to an embodiment of the present disclosure.

FIG. 8 is a functional block diagram of a decoding system 800 according to an embodiment of the present disclosure. The decoding system 800 may include a syntax unit 810, a pixel block decoder 820, an in-loop filter 830, a reference picture store 840, a predictor 850, and a controller 860. The syntax unit 810 may receive a coded video data stream and may parse the coded data into its constituent parts. Data representing coding parameters may be furnished to the controller 860 while data representing coded residuals (the data output by the pixel block coder 710 of FIG. 7) may be furnished to the pixel block decoder 820. The pixel block decoder 820 may invert coding operations provided by the pixel block coder 710 (FIG. 7). The in-loop filter 830 may filter reconstructed pixel block data. The reconstructed pixel block data may be assembled into pictures for display and output from the decoding system 800 as output video. The pictures also may be stored in the prediction buffer 840 for use in prediction operations. The predictor 850 may supply prediction data to the pixel block decoder 820 as determined by coding data received in the coded video data stream.

The pixel block decoder 820 may include an entropy decoder 822, a dequantizer 824, an inverse transform unit 826, and an adder 828. The entropy decoder 822 may perform entropy decoding to invert processes performed by the entropy coder 718 (FIG. 7). The dequantizer 824 may invert operations of the quantizer 816 of the pixel block coder 710 (FIG. 7). Similarly, the inverse transform unit 826 may invert operations of the transform unit 714 (FIG. 7). They may use the quantization parameters $Q_P$ and transform modes M that are provided in the coded video data stream. Because quantization is likely to truncate data, the data recovered by the dequantizer 824, likely will possess coding errors when compared to the input data presented to its counterpart quantizer 816 in the pixel block coder 710 (FIG. 7).

The adder 828 may invert operations performed by the subtractor 710 (FIG. 7). It may receive a prediction pixel block from the predictor 850 as determined by prediction references in the coded video data stream. The adder 828 may add the prediction pixel block to reconstructed residual values output by the inverse transform unit 826 and may output reconstructed pixel block data.

The in-loop filter 830 may perform various filtering operations on reconstructed pixel block data. As illustrated, the in-loop filter 830 may include a deblocking filter 832 and an SAO filter 834. The deblocking filter 832 may filter data at seams between reconstructed pixel blocks to reduce discontinuities between the pixel blocks that arise due to coding. SAO filters 834 may add offset to pixel values according to an SAO type, for example, based on edge direction/shape and/or pixel level. Other types of in-loop filters may also be used in a similar manner. Operation of the deblocking filter 832 and the SAO filter 834 ideally would mimic operation of their counterparts in the coding system 700 (FIG. 7). Thus, in the absence of transmission errors or other abnormalities, the decoded picture obtained from the in-loop filter 830 of the decoding system 800 would be the same as the decoded picture obtained from the in-loop filter 710 of the coding system 700 (FIG. 7); in this manner, the coding system 700 and the decoding system 800 should store a common set of reference pictures in their respective reference picture stores 740, 840.

The reference picture store 840 may store filtered pixel data for use in later prediction of other pixel blocks. The reference picture store 840 may store decoded pixel block data of each picture as it is coded for use in intra prediction. The reference picture store 840 also may store decoded reference pictures.

As discussed, the predictor 850 may supply the transformed reference block data to the pixel block decoder 820. The predictor 850 may supply predicted pixel block data as determined by the prediction reference indicators supplied in the coded video data stream.

The controller 860 may control overall operation of the coding system 800. The controller 860 may set operational parameters for the pixel block decoder 820 and the predictor 850 based on parameters received in the coded video data stream. As is relevant to the present discussion, these operational parameters may include quantization parameters $Q_P$ for the dequantizer 824 and transform modes M for the inverse transform unit 810. As discussed, the received parameters may be set at various granularities of image data, for example, on a per pixel block basis, a per picture basis, a per slice basis, a per LCU basis, or based on other types of regions defined for the input image.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several embodiments of the present disclosure are specifically illustrated and described herein. However, it will be appreciated that modifications and variations of the present disclosure are covered by the above teachings and within the purview of the appended claims without departing from the spirit and intended scope of the invention.

We claim:

1. A method, comprising:
negotiating a plurality of codec configurations of a coding session between a local device and a far-end device, wherein the negotiation is performed during operation based on exchange of parameters between the local device and the far-end device, and wherein the exchanged parameters include parameters of the negotiated plurality of codec configurations,
estimating sizes of decoded picture buffers for each of the negotiated plurality of codec configurations,
determining a largest buffer size among the estimated buffer sizes of respective negotiated plurality of codec configurations,
allocating in memory of the local device a portion of memory sized according to the determined largest buffer size, and
thereafter, exchanging coded video data with the far-end device, including
decoding coded data of reference pictures and
storing the decoded reference pictures in the allocated memory,
wherein a first codec configuration is discontinued in favor of another codec configuration and later resumed, and when the first codec configuration resumes, at least one coded picture for the first codec configuration refers to a reference picture of the first codec configuration that was decoded before the first codec configuration was discontinued.

2. The method of claim 1, wherein the exchanging of the coded video data includes exchanging coded video data coded according to the negotiated plurality of codec configurations.

3. The method of claim 1, wherein the local device is an encoding terminal and the far end device is a decoding terminal.

4. The method of claim 1, wherein the local device is a decoding terminal and the far end device is an encoding terminal.

5. The method of claim 1, further comprising:
after the exchanging of the coded video data commences, negotiating a new codec configuration with the far-end device,
estimating a size of a decoded picture buffer for the new codec configuration,
determining whether the allocated size of memory is larger than the estimated size of the decoded picture buffer for the new codec configuration,
when the allocated size of memory is not larger than the estimated size of the decoded picture buffer for the new codec configuration, re-allocating a portion of memory sized according to the estimating size of the decoded picture buffer for the new codec configuration,
otherwise, continuing exchange of coded video data with the far-end device.

6. The method of claim 1, further comprising:
when a codec configuration changes from a first configuration to a second configuration,
determining whether the local device stores reference picture(s) for the second configuration, and
when the local device stores reference picture(s) for the second configuration, moving the reference picture(s) to a decoded picture buffer for the second configuration.

7. The method of claim 1, further comprising:
when a codec configuration changes from a first configuration to a second configuration,
moving a reference picture for the first configuration to a frame memory, and
building reference picture(s) for the second configuration from exchange of coded video.

8. The method of claim 1, wherein:
a first codec configuration is discontinued in favor of another codec configuration and later resumed,
when the first codec configuration resumes, at least one coded picture for the first codec configuration refers to a reference picture of the first codec configuration that was decoded before the first codec configuration was discontinued.

9. A non-transitory computer readable medium storing program instructions that when executed by a processing device, cause the device to:
negotiate a plurality of codec configurations of a coding session between a local device and a far-end device, wherein the negotiation is performed during operation based on exchange of parameters between the local device and the far-end device, and wherein the exchanged parameters including parameters of the negotiated plurality of codec configurations,
estimate sizes of decoded picture buffers for each of the negotiated plurality of codec configurations,
determine a largest buffer size among the estimated buffer sizes of respective negotiated plurality of codec configurations,
allocate in memory of the processing device a portion of memory sized according to the largest buffer size, and
thereafter, exchange coded video data with the far-end device, including
decoding coded data of reference pictures and
storing the decoded reference pictures in the allocated memory,
wherein a first codec configuration is discontinued in favor of another codec configuration and later resumed, and when the first codec configuration resumes, at least one coded picture for the first codec configuration refers to a reference picture of the first codec configuration that was decoded before the first codec configuration was discontinued.

10. The medium of claim 9, wherein the exchange of the coded video data includes an exchange of coded video data coded according to the negotiated plurality of codec configurations.

11. The medium of claim 9, wherein the processing device is an encoding terminal and the far end device is a decoding terminal.

12. The medium of claim 9, wherein the processing device is a decoding terminal and the far end device is an encoding terminal.

13. The medium of claim 9, wherein the instructions further cause the processing device to:
   after the exchange of the coded video data commences, negotiate a new codec configuration with the far-end device,
   estimate a size of a decoded picture buffer for the new codec configuration,
   determine whether the allocated size of memory is larger than the estimated size of the decoded picture buffer for the new codec configuration,
   when the allocated size of memory is not larger than the estimated size of the decoded picture buffer for the new codec configuration, re-allocate a portion of memory sized according to the estimated size of the decoded picture buffer for the new codec configuration,
   otherwise, continue exchange of coded video data with the far-end device.

14. The medium of claim 9, wherein the instructions further cause the processing device to, when a codec configuration changes from a first configuration to a second configuration:
   determine whether the processing device has access to reference picture(s) for the second configuration, and
   when the processing device has access to reference picture(s) for the second configuration, move the reference picture(s) to a decoded picture buffer for the second configuration.

15. The medium of claim 9, wherein the instructions further cause the processing device to, when a codec configuration changes from a first configuration to a second configuration,
   move a reference picture for the first configuration to a frame memory, and
   build reference picture(s) for the second configuration from the exchange of coded video.

16. The medium of claim 9, wherein
   a first codec configuration is discontinued in favor of another codec configuration and later resumed,
   when the first codec configuration resumes, at least one coded picture for the first codec configuration refers to a reference picture of the first codec configuration that was decoded before the first codec configuration was discontinued.

17. Apparatus, comprising:
   a processor and a memory,
   the processor operating according to program instructions that cause the processor to
      negotiate a plurality of codec configurations of a coding session between the apparatus and a far-end device, wherein the negotiation is performed during operation based on exchange of parameters between the apparatus and the far-end device, and wherein the exchanged parameters including parameters of the negotiated plurality of codec configurations;
      estimate sizes of decoded picture buffers for each of the negotiated plurality of codec configurations;
      determine a largest buffer size among the estimated buffer sizes of respective negotiated plurality of codec configurations,
      allocate in the memory a portion sized according to the largest buffer; and
      thereafter, exchange coded video data, including:
         code video data predictively with reference to decoded reference pictures stored in the memory according to one of the negotiated plurality of codec configurations,
         decode coded video data of the reference pictures, and
         store the decoded reference pictures in the memory,
         wherein a first codec configuration is discontinued in favor of another codec configuration and later resumed, and when the first codec configuration resumes, at least one coded picture for the first codec configuration refers to a reference picture of the first codec configuration that was decoded before the first codec configuration was discontinued.

18. The apparatus of claim 17, wherein the processor further toggles among the negotiated plurality of codec configurations, using the allocated portion of memory for storage of decoded reference pictures generated according to the respective codec configurations.

19. The apparatus of claim 17, wherein the instructions further cause the processor to, after the exchange of the coded video data commences:
   negotiate a new codec configuration with the far-end device,
   estimate a size of a decoded picture buffer for the new codec configuration,
   determine whether the allocated size of memory is larger than the estimated size of the decoded picture buffer for the new codec configuration,
   when the allocated size of memory is not larger than the estimated size of the decoded picture buffer for the new codec configuration, re-allocate the portion of memory sized according to the estimated size of the decoded picture buffer for the new codec configuration,
   otherwise, continue exchange of coded video data with the far-end device.

20. The apparatus of claim 17, wherein the instructions further cause the processor to, when a codec configuration changes from a first configuration to a second configuration:
   determine whether the processor has access to reference picture(s) for the second configuration, and
   when the processing device has access to reference picture(s) for the second configuration, move the reference picture(s) to a decoded picture buffer for the second configuration.

21. The apparatus of claim 17, wherein the instructions further cause the processor to, when a codec configuration changes from a first configuration to a second configuration,
   move a reference picture for the first configuration to a frame memory, and
   build reference picture(s) for the second configuration from exchange of coded video.

22. The apparatus of claim 17, wherein a first codec configuration is discontinued in favor of another codec configuration and later resumed,
   when the first codec configuration resumes, at least one coded picture for the first codec configuration refers to a reference picture of the first codec configuration that was decoded before the first codec configuration was discontinued.

23. The method of claim 1, further comprising:
   when a codec configuration changes from a first configuration to a second configuration, saving a first configuration reference picture from a decoded picture buffer into a frame memory, when a codec configuration changes back to the first configuration, restoring the first configuration reference picture from the frame memory back to the decoded picture buffer, and decoding subsequent frames using the restored first configuration reference picture.

24. A method, comprising:

negotiating a plurality of codec configurations of a coding session between a local device and a far-end device, wherein the negotiation is performed during operation based on exchange of parameters between the local device and the far-end device relating to the codec configurations;

estimating sizes of decoded picture buffers for each of the negotiated plurality of codec configurations;

determining a largest buffer size among the estimated buffer sizes of respective negotiated plurality of codec configurations;

allocating in memory of the local device a portion of memory sized according to the determined largest buffer size; and thereafter, decoding coded video data received from the far-end device, including:

decoding coded data of reference pictures, and storing the decoded reference pictures in the allocated memory, wherein a first codec configuration is discontinued in favor of another codec configuration and later resumed, and when the first codec configuration resumes, at least one coded picture for the first codec configuration refers to a reference picture of the first codec configuration that was decoded before the first codec configuration was discontinued.

* * * * *